(12) United States Patent
Certain

(10) Patent No.: US 7,223,071 B2
(45) Date of Patent: May 29, 2007

(54) DEVICE FOR PROVIDING ASSISTANCE TO THE PILOT OF A ROTORCRAFT IN THE EVENT OF ENGINE FAILURE

(75) Inventor: Bernard Certain, Aix en Provence (FR)

(73) Assignee: Eurocopter, Marignane cedex (FR)

( * ) Notice: Subject to any disclaimer, the term of this patent is extended or adjusted under 35 U.S.C. 154(b) by 139 days.

(21) Appl. No.: 11/010,444

(22) Filed: Dec. 14, 2004

(65) Prior Publication Data

US 2005/0135930 A1    Jun. 23, 2005

(30) Foreign Application Priority Data

Dec. 18, 2003    (FR)    ................................... 03 14926

(51) Int. Cl.
  *B63H 3/00*    (2006.01)
(52) U.S. Cl. .......................................... 416/43; 416/44
(58) Field of Classification Search .................. 416/42, 416/43, 44
  See application file for complete search history.

(56) References Cited

U.S. PATENT DOCUMENTS

| | | | |
|---|---|---|---|
| 2,317,342 A | 4/1943 | Pullin | |
| 2,941,605 A | 6/1960 | Sikorsky | |
| 3,000,445 A | 9/1961 | Stuart, III | |
| 3,071,335 A | 1/1963 | Carter, Jr. | |
| 3,603,697 A * | 9/1971 | Lane | 416/33 |
| 3,839,923 A * | 10/1974 | Dean | 74/522 |
| 4,168,045 A * | 9/1979 | Wright et al. | 244/17.13 |
| 4,277,038 A * | 7/1981 | Yates et al. | 244/3.15 |
| 4,399,968 A * | 8/1983 | Stock et al. | 244/137.4 |
| 4,528,628 A * | 7/1985 | Fischer et al. | 701/3 |

FOREIGN PATENT DOCUMENTS

FR    2601326    1/1988

\* cited by examiner

*Primary Examiner*—Hoang Nguyen
(74) *Attorney, Agent, or Firm*—Young & Thompson

(57) ABSTRACT

The present invention provides a device enabling the collective pitch of the blades of the main rotor of a single-engined rotorcraft to be reduced automatically in the event of an engine failure. The device comprises an actuator which increases the collective pitch of the blades above a predefined threshold, and which decreases the collective pitch below the predefined threshold. The actuator is arranged on a bell crank of the mixing unit of the rotorcraft.

8 Claims, 3 Drawing Sheets

DEVICE FOR PROVIDING ASSISTANCE TO THE PILOT OF A ROTORCRAFT IN THE EVENT OF ENGINE FAILURE

The present invention relates to a flight control device for enabling the pilot to put a single-engined rotorcraft into auto-rotation in the event of an engine failure.

BACKGROUND OF THE INVENTION

In general, it is known that a single-engined rotorcraft possesses measuring instruments that provide the pilot on a continuous basis with values for the main rotor speed and for the engine speed.

The information relating to the main rotor speed is essential for the safety of the rotorcraft. Indeed, a main rotor speed too great would lead to an increase in centrifugal force on the blades, running the catastrophic risk of a blade attachment failing. A main rotor speed too small would lead to a loss of lift. Similarly, the engine speed needs to be monitored in order to remain within the bounds specified by the manufacturer of the rotorcraft, with any change in this engine speed also changing the main rotor speed.

Consequently, engine failure leads to a drop in the main rotor speed which can rapidly lead to a loss of lift for the rotorcraft. The pilot must therefore react immediately, and the only solution available to the pilot being that of reducing the collective pitch of the blades in order to change over to auto-rotation.

Auto-rotation is a technique that makes it possible with a main rotor rotating without drive from the engine, nevertheless to obtain lift that is capable of maintaining the rotorcraft in stabilized downward flight at an acceptable rate of descent. Auto-rotation thus corresponds to safety flight in the event of an engine failure. In order to ensure that the main rotor is put into auto-rotation conditions, the pilot must act immediately at the time of engine failure to reduce the collective pitch of the blades of the main rotor.

Once the collective pitch has been reduced, the pilot merely has to allow the rotorcraft to descend. The relative wind then engages the main rotor in an upward direction, thus enabling the rotor to stabilize on an auto-rotation speed.

In the event of a failure of the engine installation, it can thus readily be understood that it is essential to reduce the pitch of the blades as quickly as possible in order to retain an acceptable main rotor speed.

Nevertheless, starting from hovering flight, pitch reduction needs to be implemented very carefully in order to avoid too great an initial drop in the main rotor speed.

Document FR 2 601 326 discloses a device for switching automatically to auto-rotation flight conditions as soon as a failure appears in the engine installation. That device acts on the flight controls via an automatic pilot system.

Nevertheless, it solves the problem in part only, since some rotorcrafts do not posses an automatic pilot.

OBJECTS AND SUMMARY OF THE INVENTION

An object of the present invention is to reduce the pitch of the blades of the main rotor of a single-engined rotorcraft that does not have an automatic pilot automatically in the event of a failure of the engine installation, and to do in such a manner as to limit the drop in the main rotor speed.

According to the invention, a mechanical device enabling the collective pitch of the blades of the main rotor of a single-engined rotorcraft to be reduced automatically in the event of an engine failure comprises an actuator which increases the collective pitch of said blades from a predefined threshold and which reduces said collective pitch beneath said predefined threshold.

The predefined threshold corresponds to the engine operating at a low level of power. Advantageously, this low power level is nevertheless sufficiently high for the main rotor speed, without any action being taken on the flight controls, to remain greater than the minimum speed authorized by the manufacturer of the rotorcraft. As a result, the low power level is substantially equivalent to 20% of the nominal power of the engine.

In addition, the actuator advantageously possesses one or more of the following characteristics:

the actuator is arranged on a-rod disposed between a collective pitch control lever and a mixing unit;

the actuator is arranged on a mixing unit bell crank;

the actuator is controlled by the pressure of a gas taken from before the last turbine of the engine or from the outlet of the compressor stage of the engine.

In addition, the length of a droop lever is advantageously shortened by about 10%.

Furthermore, a dissymmetric filter unit regulating the pressure of the gas taken from the engine upstream from the actuator serves to optimize the operation of the device.

BRIEF DESCRIPTION OF THE DRAWINGS

The invention and its advantages appear in greater detail from the following description of embodiments given by way of illustration with reference to the accompanying figures, in which.

MORE DETAILED DESCRIPTION

Elements that are present in a plurality of distinct figures are given the same reference in all of them.

In the text below, the term "pilot pitch" is used for convenience to designate the pitch corresponding to the position of the collective pitch lever in the rotorcraft cockpit, and the term "swash plate pitch" is used to designate the real pitch of the swash plate.

Figure 1:
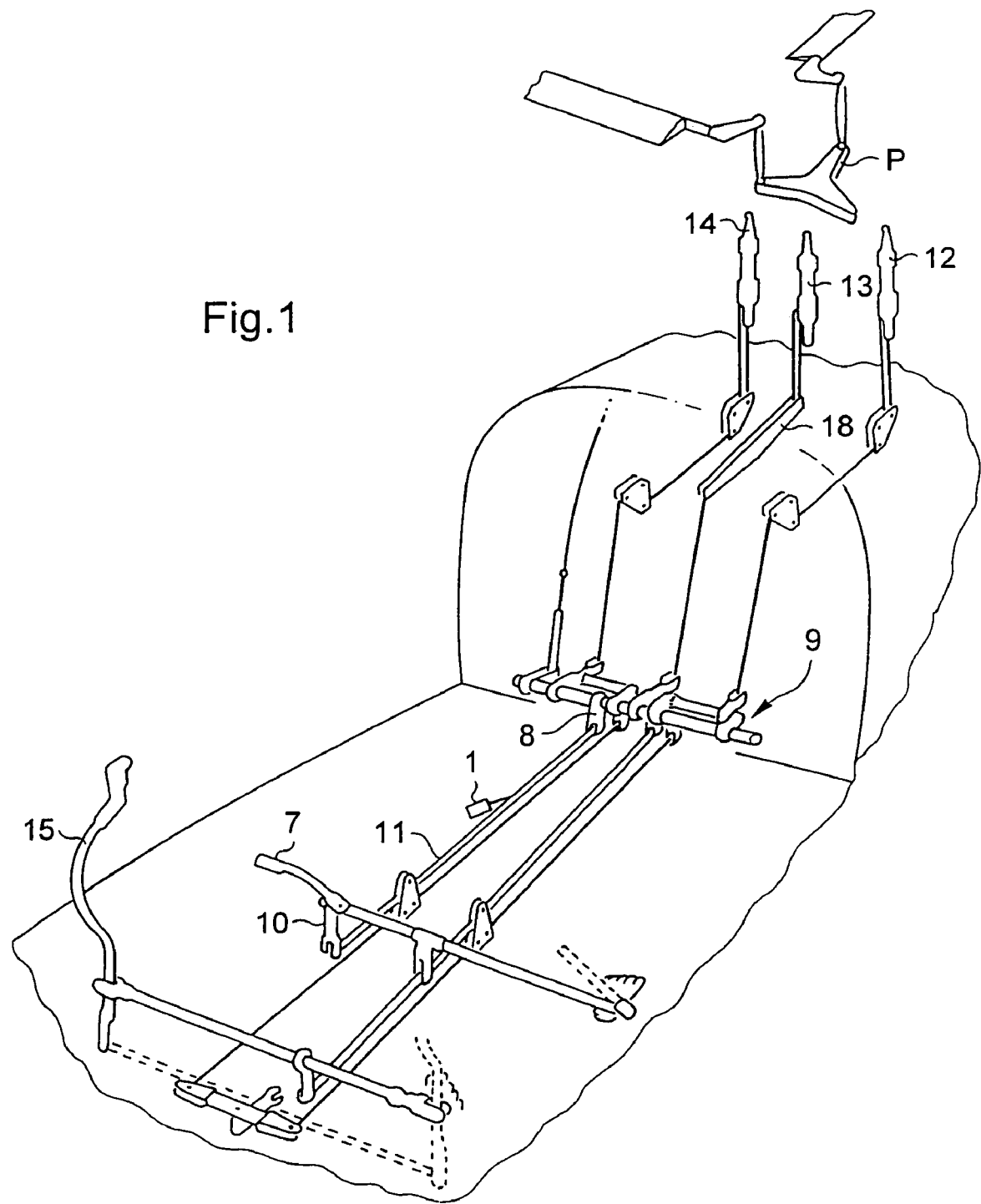
FIG. 1 is a diagrammatic view of the flight controls of a rotorcraft.

FIG. 1 is a diagrammatic view of the flight controls of a rotorcraft.

The collective pitch lever 7 enables the collective pitch of the rotorcraft to be modified. This collective pitch lever 7 is connected to the bell crank 8 from a mixing unit 9 via a second crank 10 and a rod 11. When the collective pitch lever 7 is pulled up, the mixing unit 9 transfers this control to the left, right, and longitudinal servo-controls 12, 13, and 14. These servo-controls then move through the same amount thus enabling the swash plate P to move upwards without tilting, thereby increasing the pitch of the blades of the main rotor of the rotorcraft. When the collective pitch lever 7 is lowered, the movement is reversed and the pitch of the blades decreases.

The stick 15 controls the swash plate P. When the stick 15 is pushed forwards, the longitudinal servo-control 13 retracts via the longitudinal control line, and the droop lever 18, thereby tilting the swash plate P forwards.

It is explained below that an actuator 1 disposed in series or in parallel with the pitch control line serves to cause the collective pitch of the blades to be reduced automatically in the event of an engine failure occurring.

Figure 2:
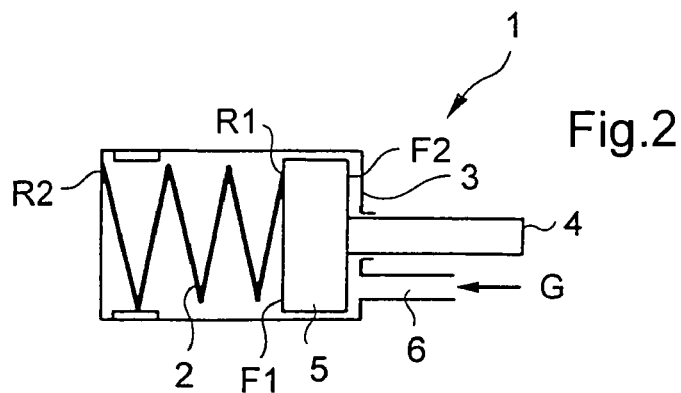
FIG. 2 shows an actuator of the invention.

FIG. 2 shows an actuator 1 of the invention. A first spring 2 is inserted in a casing 3 of said actuator 1. One end R2 of the first spring 2 is secured to the casing 3 and another end R1 is secured to the first face F1 of a piston 5, the piston 5 itself being contained in the casing 3. A second face F2 of the piston 5 is provided with a first rod 4. Gas G taken from the engine enters into the actuator via an orifice 6 and can therefore compress the moving assembly that is constituted by the spring 2, the piston 5, and the first rod 4, thereby causing the actuator to go from an extended position to a retracted position.

To do this, the pressure of the gas G entering the actuator 1 must be an accurate reflection of the state of the engine installation. The gas referenced P4, taken from ahead of the last turbine in the engine of the rotorcraft constitutes a good reference. Nevertheless, since its temperature is high, it is preferable to use the gas known as P2 as taken from the outlet of the compressor stage of the engine.

In normal flight mode, the pressure of the gas G is greater than a predefined threshold corresponding to the engine operating at a low power level. This low power level, preferably about 20% of the nominal power of the engine, is nevertheless high enough to ensure that the main rotor speed without action on the flight controls remains greater than the minimum speed authorized by the rotorcraft manufacturer. In this particular flight mode, the gas G passes through the orifice 6 and compresses the moving assembly. The actuator 1 is in the retracted position.

Otherwise, in degraded flight mode, the pressure on the gas G drops below the predefined threshold and is no longer sufficient to compress the moving assembly. The actuator 1 then takes up the extended position.

The actuator 1 can be placed in the pitch control line in several different ways.

Figure 3:
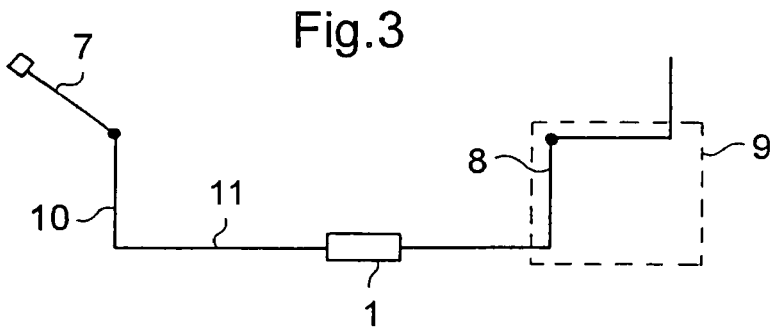
FIG. 3 shows the disposition of an actuator in a first embodiment.

FIG. 3 shows a first embodiment. In order to reduce the pitch of the blades of the main rotor automatically when a failure is detected in the engine installation, the actuator 1 is inserted in series in the pitch control line. Ideally, it is arranged in the rod 1 situated between the second crank 10 and the mixing unit. 9.

The effect of this disposition is to impart an increase to the swash plate pitch in normal flight mode, the actuator 1 being in its retracted position. The swash plate pitch is thus greater than the pilot pitch. On changing over to degraded flight mode, the actuator passes automatically into its extended position. The increase to swash plate pitch is eliminated, so swash plate pitch becomes identical to pilot pitch. The general pitch of the blades of the main rotor is thus reduced immediately.

Figure 4:
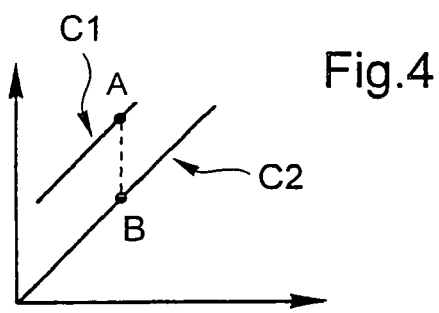
FIG. 4 is a plot of swash plate pitch against pilot pitch that is valid for a first embodiment.

FIG. 4 shows curves C1 and C2 giving swash plate pitch as a function of pilot pitch in this first embodiment, with swash plate pitch being plotted up the ordinate and pilot pitch along the abscissa. Curves C1 and C2 correspond respectively to an operating relationship under power for normal flight mode and an operating relationship under zero power for degraded flight mode. The series position of the actuator 1 alters the ordinate value at the origin for curve C1, and curves C1 and C2 are parallel.

In normal flight mode, the actuator is in its retracted position, thereby amplifying swash plate pitch (point A on curve C1). This amplification is not harmful in any way for flight. The control abutments installed relative to the collective pitch lever 7 are positioned in such a manner that the maximum pitch of the swash plate P and the maximum displacement of the collective pitch lever 7 are never exceeded whatever the position of the actuator.

If an engine failure occurs, the actuator passes automatically into its elongate position in application of the process described above. This lengthening of the actuator causes the swash plate P to move downwards and consequently immediately reduces the pitch of the main rotor blades. The swash plate pitch becomes identical to pilot pitch (point B on curve C2). The reduction of the main rotor speed is thus prevented in part.

Figure 5:
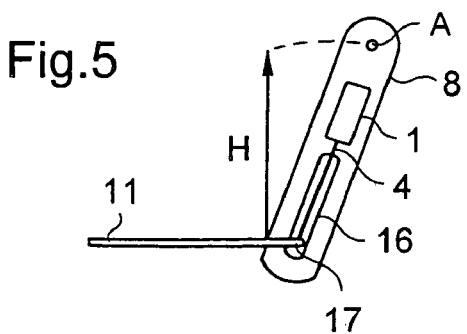
FIG. 5 shows the disposition of an actuator in a second embodiment.

FIG. 5 shows a second embodiment. The actuator is installed in a configuration where it is in parallel with the pitch control line.

The bell crank 8 of the mixing unit 9 is provided with a pivot axis A and an oblong hole 16, with the end 17 of the rod 11 being placed in the oblong hole 16. The actuator 1 is arranged on the bell crank 8. In addition, the first rod 4 of the actuator 1 is connected to the end 17 of the control rod 11. Under such conditions, the actuator has an influence on the height H between the pivot axis A and the end 17.

By acting on the height H of the lever arm, the actuator 1 serves to switch over from a power operating relationship for normal flight mode to a zero power operating relationship for degraded flight mode, and vice versa.

Figure 6:
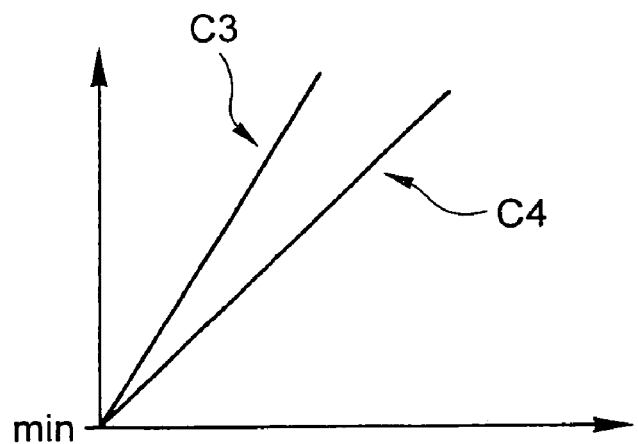
FIG. 6 is a plot of swash plate pitch against pilot pitch that is valid for a second embodiment.

FIG. 6 shows curves C3 and C4 for swash plate pitch as a function of pilot pitch in this second embodiment, where swash plate pitch is plotted up the ordinate and pilot pitch along the abscissa. The curves C3 and C4 relating to the respective relationships for power operation and for zero power operation intersect. Their common points correspond to the minimum pitch referenced "min".

This disposition has the advantage of allowing the pilot to access the minimum pitch min under all circumstances. It is possible that the actuator might itself fail and no longer fulfill its function. If it remains jammed in its extended position, the pilot can still reach minimum pitch min and thus maneuver in full safety.

Furthermore, it has been found that when switching off to degraded flight mode, a mode in which the engine installation has failed, it is essential for the pitch of the main rotor blades to be reduced immediately. Whatever the embodiment used, the actuator 1 performs this function well. However, experience has shown that during certain stages of flight, this action does not suffice.

During cruising flight, a reduction in pitch leads to the rotorcraft starting to dive. This leads to a reduction in the load factor, i.e. to a reduction in the forces and the moments applied to the blades. This reduction leads to an additional drop of the main rotor speed. To counter this phenomenon and thus to obtain a substantial improvement during the maneuver, it is necessary to raise the nose of the rotorcraft slightly.

To do this, the length of the droop lever 18 of the longitudinal servo-control 13 is shortened so as to shorten this servo-control 13 slightly. The coupling thus achieved between the general pitch and the longitudinal fore-and-aft cyclic pitch improves the effectiveness of reducing pitch. Advantageously, this shortening is about 10%.

In addition, automatically increasing or reducing blade pitch as a function of the state of the engine installation needs to be undertaken under the best possible conditions.

It is known in general terms that the main rotor speed is associated with the power developed by the engine. In order to avoid having a system that is unstable, i.e. a system in which the collective pitch of the blades is stabilized while engine power is increasing, the increase in collective pitch must be performed over a length of time that is of the same order as that relating to the increase in the power developed by the engine. Conversely, since the drop in power is instantaneous in the event of engine failure, the reduction in pitch must be immediate in order to keep an acceptable main rotor speed.

Figure 7:
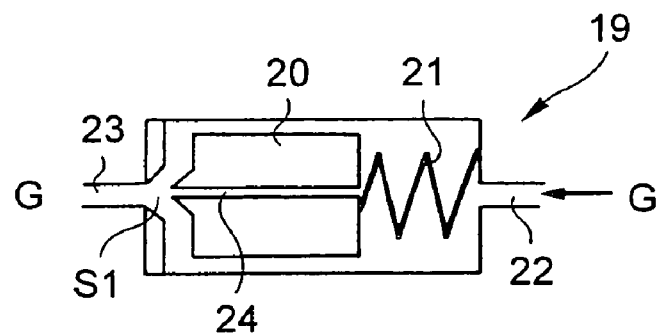
FIG. 7 shows an embodiment of a dissymmetric filter unit.

As a result, a dissymmetric filter unit 19 shown in FIG. 7 is disposed between the engine installation and the actuator 1.

This dissymmetric filter unit 19 comprises a moving portion 20 connected to a second spring 21 and pierced in its center by a narrow channel 24. The gas G taken from the engine installation penetrates into the dissymmetric filter unit 19 via a first duct 22 and leaves via a second duct 23 in order to be directed towards the orifice 6 of the actuator 1.

At rest, with the engine switched off, the gas feed G is zero. The spring 21 is relaxed, thereby pressing the moving portion 20 against the second duct 23. The flow section S1 is then at a minimum which is equal to the section of the narrow channel 24.

Figure 8:
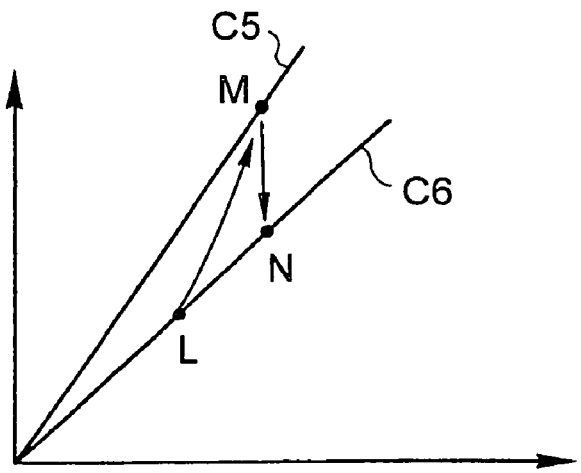
FIG. 8 is a plot showing the dynamic range of the dissymmetric filter unit.

When the engine is started, the pressure of the gas feed G increases. The gas G cannot pass into the second duct 23 without passing along the flow section S1, which section is then at its minimum and equal to the section of the narrow channel 24. Under such conditions, the pressure of the gas G at the inlet to the orifice 6 of the actuator 1 increases slowly. With reference to FIG. 8, the actuator 1 therefore passes from an extended position (point L on curve C6) to a retracted position (point M on curve C5) in progressive manner over a duration that is substantially equivalent to the time during which power from the engine increases.

In contrast, if an engine failure occurs, the pressure of the gas G drops markedly. Consequently, the pressure upstream from the moving portion 20 is less than that exists in the second duct 23. As a result, the moving portion 20 is pushed away, compressing the spring 21. The flow section S1 then takes on its maximum value equal to the section of the second duct 23. Under such conditions, the pressure of the gas G at the inlet to the orifice 6 of the actuator 1 drops quickly. The actuator 1 passes from the extended position (point N on curve C6) almost instantaneously.

Naturally, the present invention is capable of being embodied in a wide variety of ways. Although several embodiments are described above, it will be understood that it is not possible to identify exhaustively all possible embodiments. It is naturally possible to replace any means described by equivalent means without thereby going beyond the ambit of the present invention.

What is claimed is:

1. A device enabling the collective pitch of the blades of the main rotor of a single-engined rotorcraft to be reduced automatically in the event of an engine failure, comprising:
    an actuator means for increasing said collective pitch of the blades when said engine is operating above a predefined threshold and for immediately changing a pitch of a swash plate to a pilot pitch to decrease said collective pitch of the blades as said engine passes below said predefined threshold, said predefined threshold corresponding to said engine operating at a low level of power, said low power level enabling the main rotor speed to be greater than an authorized minimum speed, said actuator means being controlled by pressure of a gas taken from said engine;
    a connection that connects said actuator means to the swash plate; and
    a dissymmetric filter unit that regulates the pressure of said gas upstream from said actuator means.

2. A device according to claim 1, wherein said low power corresponds substantially to 20% of the nominal power of said rotorcraft engine.

3. A device according to claim 1, wherein a rod is disposed between a collective pitch control lever and a mixing unit, said actuator means being arranged in said rod.

4. A device according to claim 1, wherein said actuator means is arranged on a bell crank of said mixing unit.

5. A device according to claim 1, wherein said gas is taken from ahead of the last turbine of said engine.

6. A device according to claim 1, wherein said gas is taken from the outlet of the compressor stage of said engine.

7. A device enabling the collective pitch of the blades of the main rotor of a single-engine rotorcraft to be reduced automatically in the event of an engine failure, said device comprising:
    actuator means for increasing said collective pitch of the blades above a predefined threshold and for decreasing said collective pitch of the blades below said predefined threshold, said predefined threshold corresponding to said engine operating at a low level of power, said low power level enabling the main rotor speed to be greater than an authorized minimum speed; and
    a dissymmetric filter unit that regulates the pressure of the gas upstream from the actuator means.

8. A device according to claim 1, wherein the length of a droop lever is shortened by about 10% relative to a droop lever in a rotorcraft without said actuator means.

* * * * *